(12) United States Patent
Tanaka

(10) Patent No.: US 11,071,913 B2
(45) Date of Patent: *Jul. 27, 2021

(54) PROGRAM, GAME SYSTEM, ELECTRONIC DEVICE, SERVER, AND GAME CONTROL METHOD FOR IMPROVING OPERABILITY FOR USER INPUT

(71) Applicant: CYGAMES, INC., Tokyo (JP)

(72) Inventor: Yasuhiro Tanaka, Tokyo (JP)

(73) Assignee: CYGAMES, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/667,223

(22) Filed: Oct. 29, 2019

(65) Prior Publication Data
US 2020/0061464 A1 Feb. 27, 2020

Related U.S. Application Data

(63) Continuation of application No. 15/826,391, filed on Nov. 29, 2017, now Pat. No. 10,525,346, which is a
(Continued)

(30) Foreign Application Priority Data

May 29, 2015 (JP) .............................. JP2015-110319

(51) Int. Cl.
*A63F 13/426* (2014.01)
*A63F 13/35* (2014.01)
(Continued)

(52) U.S. Cl.
CPC ........ *A63F 13/426* (2014.09); *A63F 13/2145* (2014.09); *A63F 13/35* (2014.09);
(Continued)

(58) Field of Classification Search
CPC .... A63F 13/2145; A63F 13/35; A63F 13/426; A63F 13/5378; A63F 13/87; A63F 13/92
(Continued)

(56) References Cited

U.S. PATENT DOCUMENTS 8,550,919 B2 * 10/2013 Kajii ...................... A63F 13/48
463/42
2004/0229687 A1 * 11/2004 Miyamoto ............. A63F 13/10
463/30
(Continued)

FOREIGN PATENT DOCUMENTS

JP 2008-212269 * 9/2008 ............. A63F 13/48

*Primary Examiner* — Michael A Cuff
(74) *Attorney, Agent, or Firm* — Osha Bergman Watanabe & Burton LLP

(57) ABSTRACT

The present invention provides a program for a game in which characters operated by an electronic device and other electronic devices are placed in a common game field to play the game, the program causing the electronic device to execute receiving positions of the individual characters in the game field from a server; displaying a radar screen and icons; determining whether or not one of the icons has been touched; obtaining a touch termination position indicating a touched position that is detected just before a touch termination in a case where an icon has been touched and the touch has been terminated; determining whether the touch termination position falls within a predetermined range; and sending a sending request to the server in a case where the touch termination position falls within the predetermined range so that the server will send icon information to at least one of the other electronic devices.

6 Claims, 12 Drawing Sheets

Related U.S. Application Data continuation of application No. PCT/JP2016/064590, filed on May 17, 2016.

(51) Int. Cl.
  *A63F 13/2145*  (2014.01)
  *A63F 13/87*  (2014.01)
  *A63F 13/5378*  (2014.01)
  *A63F 13/92*  (2014.01)

(52) U.S. Cl.
  CPC .......... *A63F 13/5378* (2014.09); *A63F 13/87* (2014.09); *A63F 13/92* (2014.09)

(58) Field of Classification Search
  USPC .......................................................... 463/31
  See application file for complete search history.

(56) References Cited

U.S. PATENT DOCUMENTS

| | | | |
|---|---|---|---|
| 2007/0026944 A1* | 2/2007 | Maehiro | A63F 13/822 |
| | | | 463/31 |
| 2008/0119268 A1* | 5/2008 | Kando | A63F 13/00 |
| | | | 463/31 |
| 2008/0139310 A1* | 6/2008 | Kando | A63F 13/005 |
| | | | 463/33 |
| 2010/0279776 A1* | 11/2010 | Hall | A63F 13/12 |
| | | | 463/42 |
| 2012/0270653 A1* | 10/2012 | Kareemi | A63F 13/52 |
| | | | 463/33 |
| 2016/0187989 A1* | 6/2016 | Kim | G02B 13/00 |
| | | | 345/173 |

\* cited by examiner

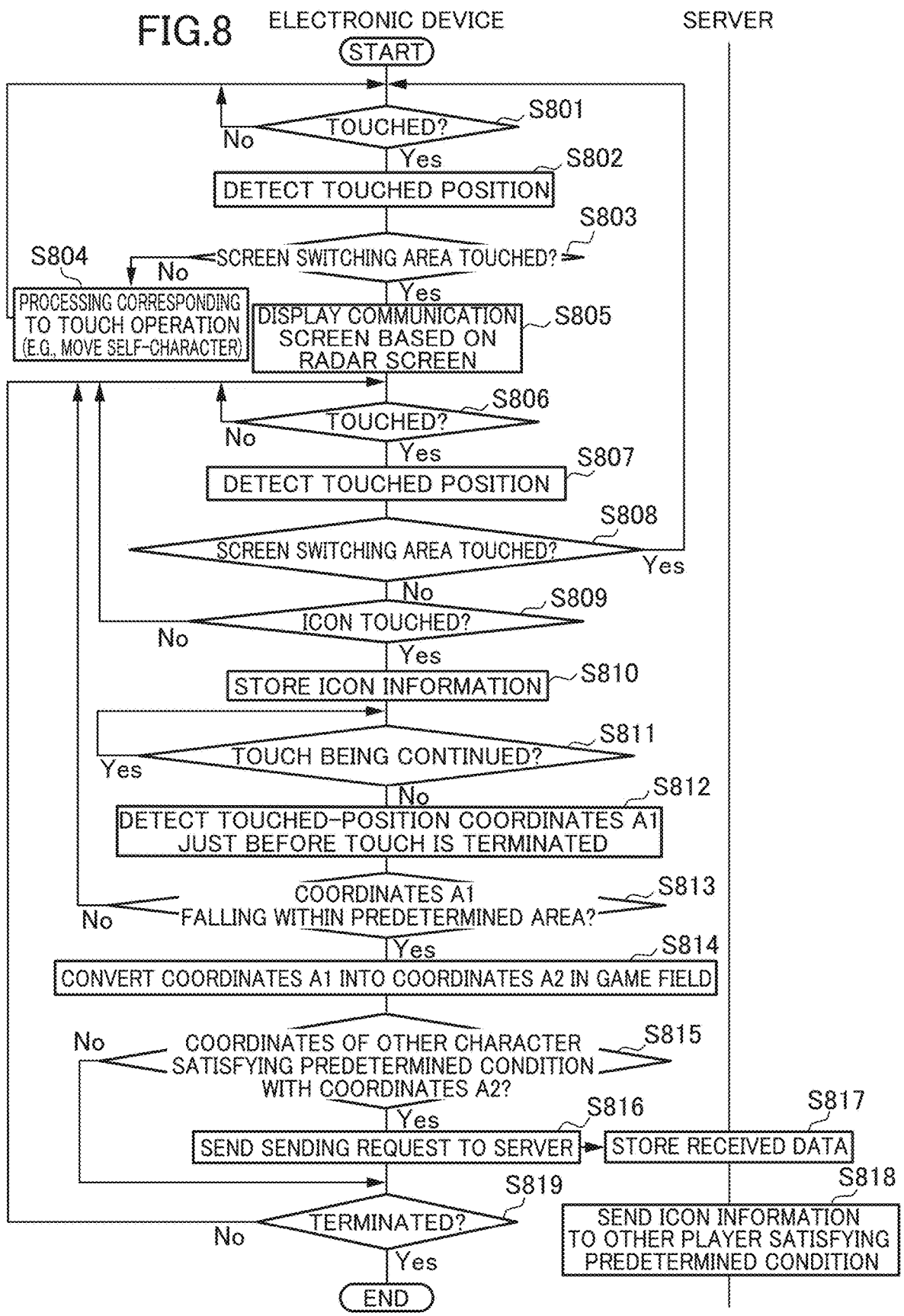

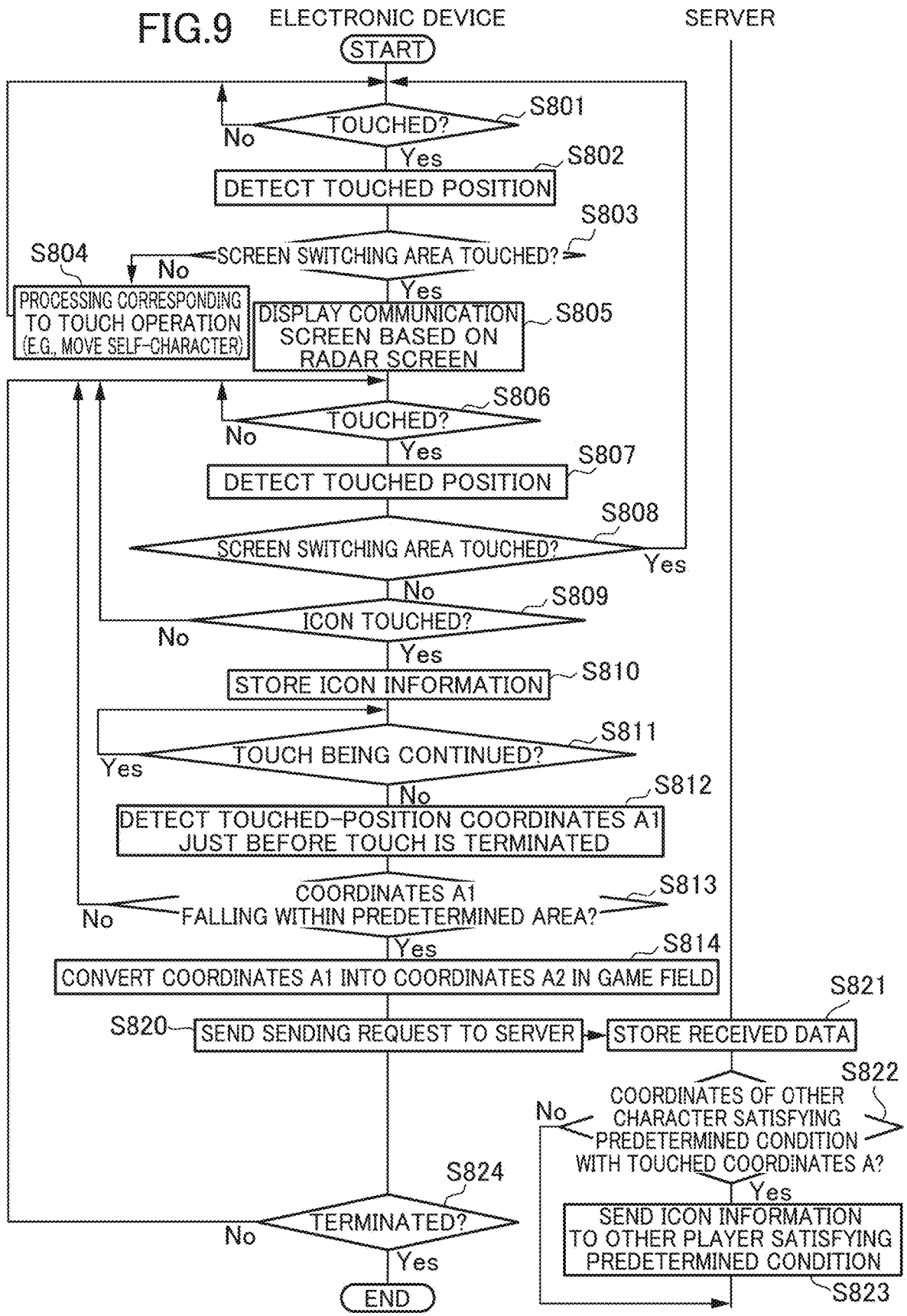

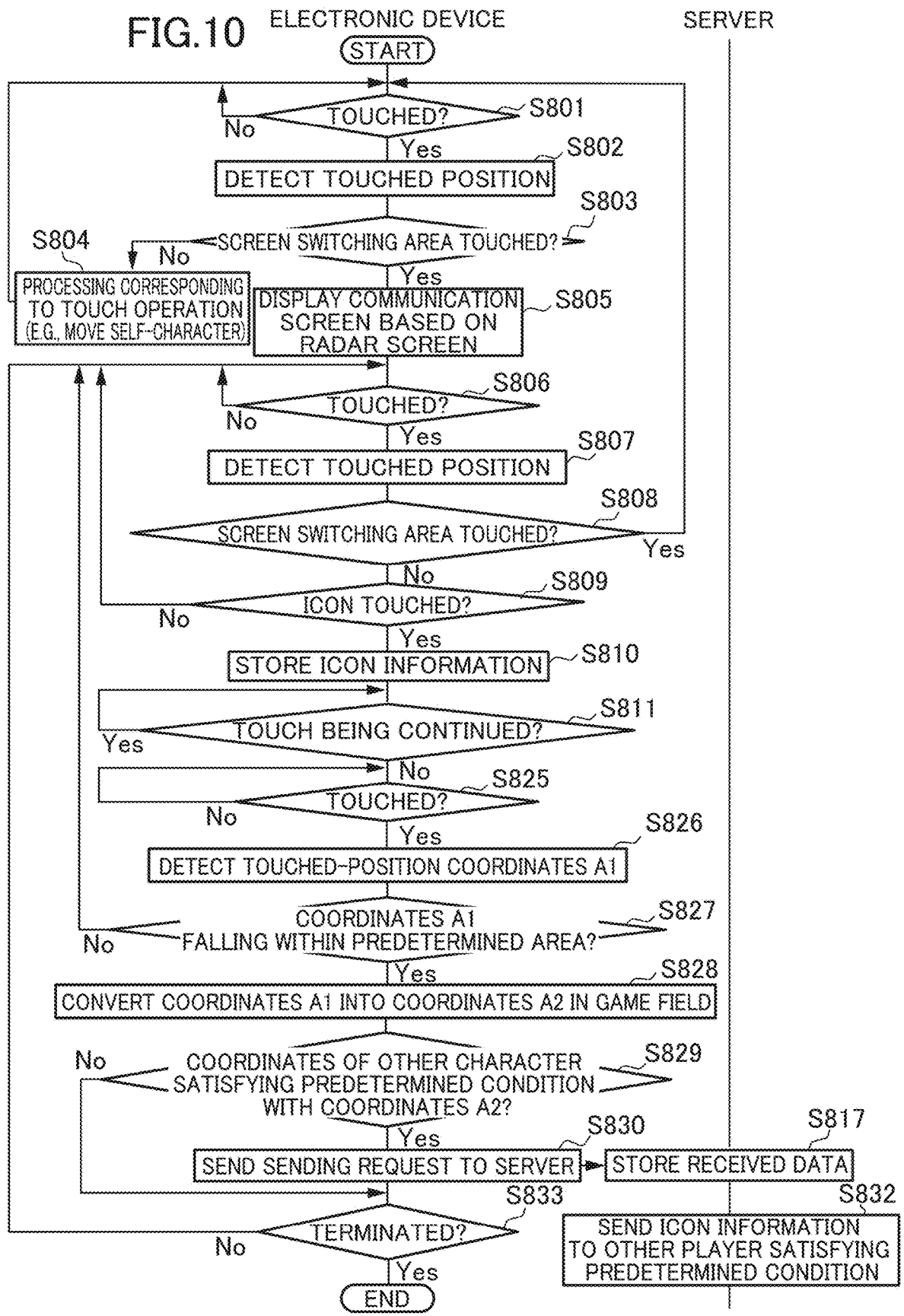

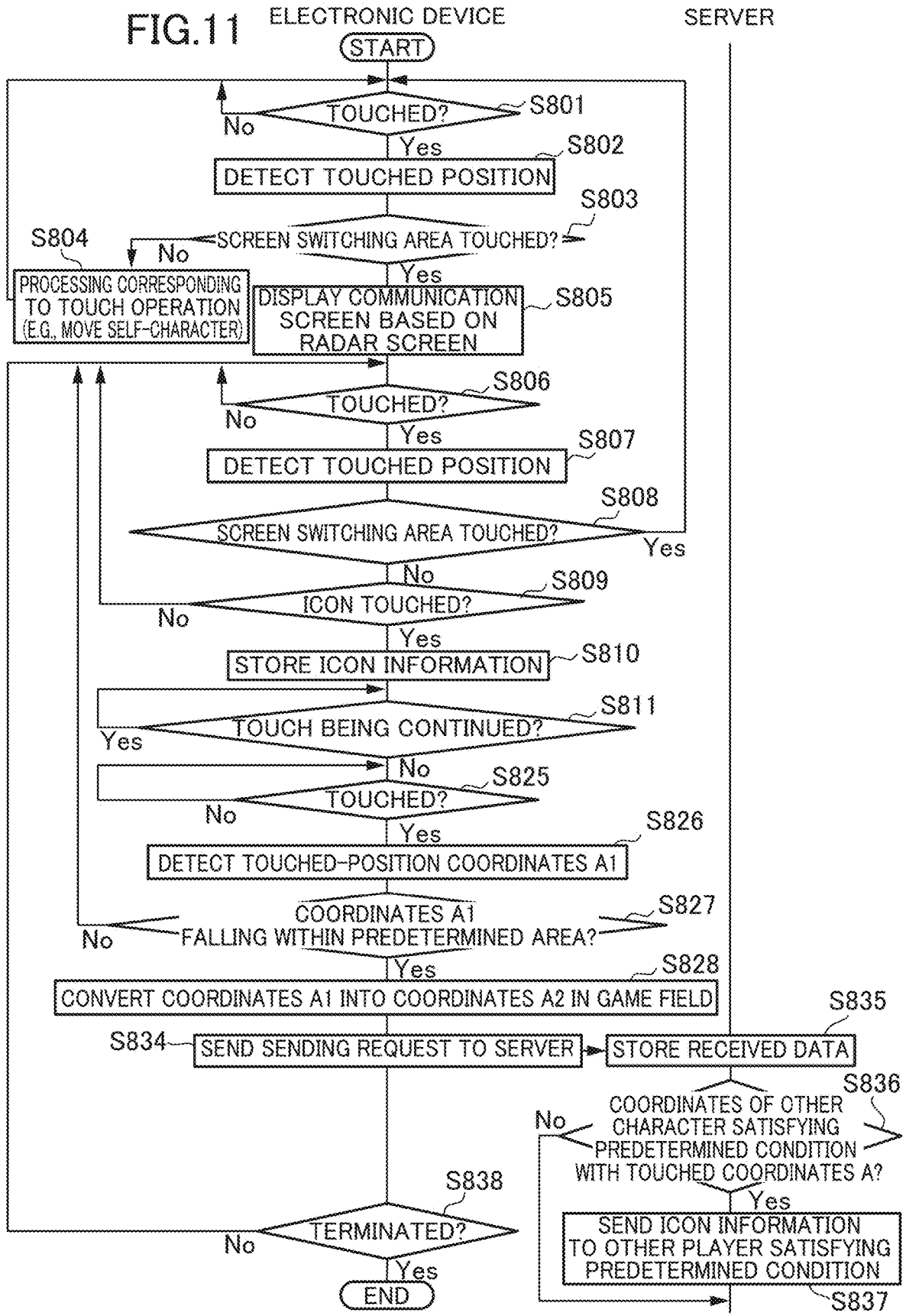

us 11,071,913 B2

PROGRAM, GAME SYSTEM, ELECTRONIC DEVICE, SERVER, AND GAME CONTROL METHOD FOR IMPROVING OPERABILITY FOR USER INPUT

CROSS-REFERENCE TO RELATED APPLICATIONS

This application claims benefit, under 35 U.S.C. § 119, of U.S. patent application Ser. No. 15/826,391 filed on Nov. 29, 2017 and entitled "PROGRAM, GAME SYSTEM, ELECTRONIC DEVICE, SERVER, AND GAME CONTROL METHOD FOR IMPROVING OPERABILITY FOR USER INPUT," which is incorporated herein by reference in its entirety.

TECHNICAL FIELD

The present invention relates to a program, a game system, an electronic device, a server, and a game control method for improving the operability for user input in a game involving a network.

BACKGROUND ART

Recently, an increasing number of players are enjoying network-enabled games in which a plurality of players can participate via a network. Such games are realized by a game system in which an electronic device such as a game machine, a PC terminal, or a mobile phone carries out communications with a server device or the like of a game administrator. A player operating an electronic device can proceed with a game while cooperating with other players or battling against other players in a battle game.

Regarding this type of game involving a network, a game in which a plurality of players operate their individual characters at their individual game devices, because of its nature, often requires information about the situations of characters operated by other players and also often requires communications among the participating players.

For example, Patent Literature 1 describes that, in a game in which a plurality of players operate their individual characters at their individual game devices, a radar screen for indicating the positions of the individual characters in a virtual game space is displayed. Furthermore, Patent Literature 2 describes facilitating the input of messages exchanged among players.

CITATION LIST

Patent Literature

{PTL 1}
Japanese Unexamined Patent Application, Publication No. 2004-329744
{PTL 2}
Japanese Unexamined Patent Application, Publication No. 2002-346230

SUMMARY OF INVENTION

Technical Problem

While the use of the above-described type of game involving a network is expanding, with the recent improvements in touchscreen technologies, electronic devices of the type in which a user interface on a touchscreen is used for user input have become common.

Although communications among players are required, as described earlier, in the case where a game is played on a smartphone or the like, since character input operations are laborious, it is difficult for a player to send a message at the intended sending timing. Furthermore, since the game proceeds even while making inputs for communications, the player may fall into a disadvantageous situation in the game if it takes the player time to perform message sending operations. Furthermore, conventional communication interfaces are directed to sending a message to a specific person, and do not allow sending a message in association with a specific position or sending a message while checking the movements of other players. Meanwhile, in a game in which a plurality of players participate, in particular, in a battle game in which a player cooperates with other players in a battle with an opponent team, it becomes necessary in many cases to send a message to another player at a specific position or to send a message while checking the movements of other players. Therefore, in the case where a conventional communication interface is adopted, it is not possible to carry out communications smoothly among players, which might compromise the enjoyment of the game.

The present invention has been made in view of the situation described above and provides a user interface that serves to enhance the enjoyment of a game.

Solution to Problem

The problems described above are solved by the present invention having the following features. Specifically, a non-transitory computer readable medium storing a program according to an aspect of the present invention is a non-transitory computer readable medium storing a program for a game in which characters operated by an electronic device and one or more other electronic devices connected to a server via a network are placed in a common game field to play the game, the electronic device including a display unit and a contact-type position input device and detecting a touched position corresponding to a touch on the contact-type position input device by a player as coordinates on the contact-type position input device, the program causing the electronic device to execute a step of receiving virtual coordinate positions indicating positions of the individual characters in the game field from the server; a step of displaying, on the basis of a predetermined touch operation on the contact-type position input device, a radar screen indicating the virtual coordinate positions of a self-character operated by the player and other characters operated by the other electronic devices in a predetermined area of the display unit and one or more icons outside the predetermined area, a step of determining, in a case where a touch on the contact-type position input device has been detected with the radar screen and the icons displayed, whether or not one of the icons has been touched on the basis of whether or not the detected touched position falls within a coordinate range corresponding to a displayed position of that icon; a step of obtaining a touch termination position indicating a touched position that is detected just before a touch termination in a case where the icon has been touched and the touch on the contact-type position input device has been terminated or a step of obtaining a detected retouched position in a case where a touch is detected again after the touch on the contact-type position input device has been terminated; a step of determining whether or not the touch termination position or the retouched position falls within a coordinate range corresponding to the predetermined area of the display unit; and a step of sending a sending request to the server in a case where the touch termination position or the retouched position falls within the coordinate range corresponding to the predetermined area of the display unit so that the server will send icon information corresponding to the touched icon to at least one of the other electronic devices.

In a program according to an aspect of the present invention, the program causes the electronic device to further execute a step of converting the touch termination position or the retouched position into a virtual coordinate position; and a step of determining whether or not the virtual coordinate position of the touch termination position or the retouched position and the virtual coordinate position of each of the other characters satisfy a predetermined condition, and the at least one of the other electronic devices is an other electronic device that operates an other character satisfying the predetermined condition.

In a program according to an aspect of the present invention, the program causes the electronic device to further execute a step of converting the touch termination position or the retouched position into a virtual coordinate position, and the step of sending the sending request to the server includes a step of sending the converted virtual coordinate position in order to allow the server to determine whether or not the virtual coordinate position of the touch termination position or the retouched position and the virtual coordinate position of each of the other characters satisfy a predetermined condition to determine an other electronic device operating an other character satisfying the predetermined condition as the at least one of the other electronic devices.

According to an aspect of the present invention, the predetermined condition includes a condition that the distance between the virtual coordinate position of the touch termination position or the retouched position and the virtual coordinate position of the other character is within a predetermined distance.

According to an aspect of the present invention, the at least one of the other electronic devices is an other electronic device that operates an other character having a predetermined relationship with the self-character.

According to an aspect of the present invention, the icon information is a text message, illustration, stamp, figure, image, voice, or video corresponding to the icon and to be displayed or reproduced by the other electronic devices or command information for displaying or reproducing these kinds of data stored at the server or the other electronic devices.

A game system according to an aspect of the present invention is a game system that includes a server and an electronic device and one or more other electronic devices connected to the server via a network and that places characters operated by the individual electronic devices connected to the server in a common game field to proceed with a game, the electronic device including a display unit and a contact-type position input device and detecting a touched position corresponding to a touch on the contact-type position input device by a player as coordinates on the contact-type position input device, wherein the server includes a virtual-coordinate-position receiving part configured to receive virtual coordinate positions indicating positions of the individual characters operated by the individual electronic devices in the game field; and a virtual-coordinate-position sending part configured to send the received virtual coordinate positions to each of the electronic devices, wherein the electronic device includes a virtual-coordinate-position receiving part configured to receive the virtual coordinate positions of the individual characters from the server; a communication-screen displaying part configured to display, on the basis of a predetermined touch operation on the contact-type position input device, a radar screen indicating the virtual coordinate positions of a self-character operated by the player and other characters operated by the other electronic devices in a predetermined area of the display unit and one or more icons outside the predetermined area; a first touched-position determining part configured to determine, in a case where a touch on the contact-type position input device has been detected with the radar screen and the icons displayed, whether or not one of the icons has been touched on the basis of whether or not the detected touched position falls within a coordinate range corresponding to a displayed position of that icon; a touch-termination-position obtaining part configured to obtain a touch termination position indicating a touched position that is detected just before a touch termination in a case where the icon has been touched and the touch on the contact-type position input device has been terminated or a retouched-position obtaining part configured to obtain a detected retouched position in a case where a touch is detected again after the touch on the contact-type position input device has been terminated; a second touched-position determining part configured to determine whether or not the touch termination position or the retouched position falls within a coordinate range corresponding to the predetermined area of the display unit; and a data sending part configured to send a sending request to the server in a case where the touch termination position or the retouched position falls within the coordinate range corresponding to the predetermined area of the display unit so that the server will send icon information corresponding to the touched icon to at least one of the other electronic devices, and wherein the server, upon receiving the sending request, sends the icon information to the at least one of the other electronic devices.

According to an aspect of the present invention, the electronic device further includes a coordinate-position converting part configured to convert the touch termination position or the retouched position into a virtual coordinate position; and a coordinate-position determining part configured to determine whether or not the virtual coordinate position of the touch termination position or the retouched position and the virtual coordinate position of each of the other characters satisfy a predetermined condition, and the at least one of the other electronic devices is an other electronic device that operates an other character satisfying the predetermined condition.

According to an aspect of the present invention, the electronic device further includes a coordinate-position converting part configured to convert the touch termination position or the retouched position into a virtual coordinate position, and the sending request further includes information about the virtual coordinate position of the touch termination position or the retouched position, the server further includes a coordinate-position determining part configured to determine whether or not the virtual coordinate position of the touch termination position or the retouched position and the virtual coordinate position of each of the other characters satisfy a predetermined condition, and the at least one of the other electronic devices is an other electronic device that operates an other character satisfying the predetermined condition.

According to an aspect of the present invention, the predetermined condition includes a condition that the distance between the virtual coordinate position of the touch termination position or the retouched position and the virtual coordinate position of the other character is within a predetermined distance.

According to an aspect of the present invention, the at least one of the other electronic devices is an other electronic device that operates an other character having a predetermined relationship with the self-character.

According to an aspect of the present invention, the icon information is a text message, illustration, stamp, figure, image, voice, or video corresponding to the icon and to be displayed or reproduced by the other electronic devices or command information for displaying or reproducing these kinds of data stored at the server or the other electronic devices.

An electronic device according to an aspect of the present invention is an electronic device in a game system that includes a server and the electronic device and one or more other electronic devices connected to the server via a network and that places characters operated by the individual electronic devices connected to the server in a common game field to proceed with a game, the electronic device including a display unit and a contact-type position input device and detecting a touched position corresponding to a touch on the contact-type position input device by a player as coordinates on the contact-type position input device, the electronic device including a virtual-coordinate-position receiving part configured to receive virtual coordinate positions indicating positions of the individual characters in the game field from the server; a communication-screen displaying part configured to display, on the basis of a predetermined touch operation on the contact-type position input device, a radar screen indicating the virtual coordinate positions of a self-character operated by the player and other characters operated by the other electronic devices in a predetermined area of the display unit and one or more icons outside the predetermined area; a first touched-position determining part configured to determine, in a case where a touch on the contact-type position input device has been detected with the radar screen and the icons displayed, whether or not one of the icons has been touched on the basis of whether or not the detected touched position falls within a coordinate range corresponding to a displayed position of that icon; a touch-termination-position obtaining part configured to obtain a touch termination position indicating a touched position that is detected just before a touch termination in a case where the icon has been touched and the touch on the contact-type position input device has been terminated or a retouched-position obtaining part configured to obtain a detected retouched position in a case where a touch is detected again after the touch on the contact-type position input device has been terminated; a second touched-position determining part configured to determine whether or not the touch termination position or the retouched position falls within a coordinate range corresponding to the predetermined area of the display unit; and a data sending part configured to send a sending request to the server in a case where the touch termination position or the retouched position falls within the coordinate range corresponding to the predetermined area of the display unit so that the server will send icon information corresponding to the touched icon to at least one of the other electronic devices.

A server according to an aspect of the present invention is a server in a game system that includes the server and an electronic device and one or more other electronic devices connected to the server via a network and that places characters operated by the individual electronic devices connected to the server in a common game field to proceed with a game, the server including a virtual-coordinate-position receiving part configured to receive virtual coordinate positions indicating positions of the individual characters operated by the individual electronic devices in the game field; and a virtual-coordinate-position sending part configured to send the received virtual coordinate positions to each of the electronic devices, wherein the server, upon receiving from the electronic device a sending request for sending icon information to the other electronic devices, the sending request including the icon information and a virtual coordinate position accompanying the icon information, determines whether or not the virtual coordinate position accompanying the icon information and the virtual coordinate position of each of the other characters operated by the other electronic devices satisfy a predetermined condition and sends the icon information to the other electronic devices operating other characters satisfying the predetermined condition.

A game control method according to an aspect of the present invention is a game control method in a game system that includes a server and an electronic device and one or more other electronic devices connected to the server via a network and that places characters operated by the individual electronic devices connected to the server in a common game field to proceed with a game, the electronic device including a display unit and a contact-type position input device and detecting a touched position corresponding to a touch on the contact-type position input device by a player as coordinates on the contact-type position input device, the game control method including a step in which the server receives virtual coordinate positions indicating positions of the individual characters operated by the individual electronic devices in the game field; a step in which the server sends the received virtual coordinate positions to each of the electronic devices; a step in which the electronic device receives the virtual coordinate positions of the individual characters from the server; a step in which the electronic device displays, on the basis of a predetermined touch operation on the contact-type position input device, a radar screen indicating the virtual coordinate positions of a self-character operated by the player and other characters operated by the other electronic devices in a predetermined area of the display unit and one or more icons outside the predetermined area; a step in which the electronic device determines, in a case where a touch on the contact-type position input device has been detected with the radar screen and the icons displayed, whether or not one of the icons has been touched on the basis of whether or not the detected touched position falls within a coordinate range corresponding to a displayed position of that icon; a step in which the electronic device obtains a touch termination position indicating a touched position that is detected just before a touch termination in a case where the icon has been touched and the touch on the contact-type position input device has been terminated or a step in which the electronic device obtains a detected retouched position in a case where a touch is detected again after the touch on the contact-type position input device has been terminated; a step in which the electronic device determines whether or not the touch termination position or the retouched position falls within a coordinate range corresponding to the predetermined area of the display unit; a step in which the electronic device sends a sending request to the server in a case where the touch termination position or the retouched position falls within the coordinate range corresponding to the predetermined area of the display unit so that the server will send icon information corresponding to the touched icon to at least one of the other electronic devices; and a step in which the server, upon receiving the sending request, sends the icon information to the at least one of the other electronic devices.

Advantageous Effects of Invention

The present invention provides a user interface for carrying out communications among players by using a radar screen for displaying positions of individual characters in a virtual game space, thereby enabling a player to send a message or the like at an intended timing or to a destination not associated with a person but with a position, while checking the radar screen. Therefore, the present invention facilitates communications among players, which helps a plurality of players prepare and execute a cooperating strategy, serving to enhance the enjoyment of a game.

BRIEF DESCRIPTION OF DRAWINGS

FIG. 8 shows a first embodiment of a flowchart for explaining information processing at a user interface for carrying out communications among players in the game system according to the embodiment of the present invention.

FIG. 9 shows a second embodiment of a flowchart for explaining information processing at a user interface for carrying out communications among players in the game system according to the embodiment of the present invention.

FIG. 10 shows a third embodiment of a flowchart for explaining information processing at a user interface for carrying out communications among players in the game system according to the embodiment of the present invention.

FIG. 11 shows a fourth embodiment of a flowchart for explaining information processing at a user interface for carrying out communications among players in the game system according to the embodiment of the present invention.

DESCRIPTION OF EMBODIMENTS

An embodiment of the present invention will be described below with reference to the drawings. In a game system according to this embodiment, a plurality of electronic devices are connected via a network or the like, and the individual electronic devices send and receive information, whereby a game in which a plurality of players can participate is provided. The players can commonly enjoy a game by operating their individual characters on their individual electronic devices in a virtual space set by the game system.

The game system according to this embodiment, in which the individual electronic devices are connected via a network as described above, is assumed to be a server-client system; alternatively, however, the game system may be configured as a system not including a server, such as a P-to-P system. Here, a player refers to a user who operates an electronic device when a game is executed, i.e., a concept corresponding to a client in what is called a server-client system. Generally, a player can participate in a game via what is called a character that performs activities, actions, etc. in a virtual game space. Thus, in this description, there are cases where what is simply referred to as a player refers to a character.

Furthermore, for convenience of description, in this description, there are cases where players who participate in a game other than a player who operates an electronic device are referred to as other players, a character operated on an electronic device by a player himself or herself is referred to as a self-character, and characters operated on other electronic devices by other players are referred to as other characters. Similarly, there are cases where an electronic device operated by a player is referred to as an electronic device, and electronic devices operated by other players are referred to as other electronic devices.

[System Configuration]

Figure 1:
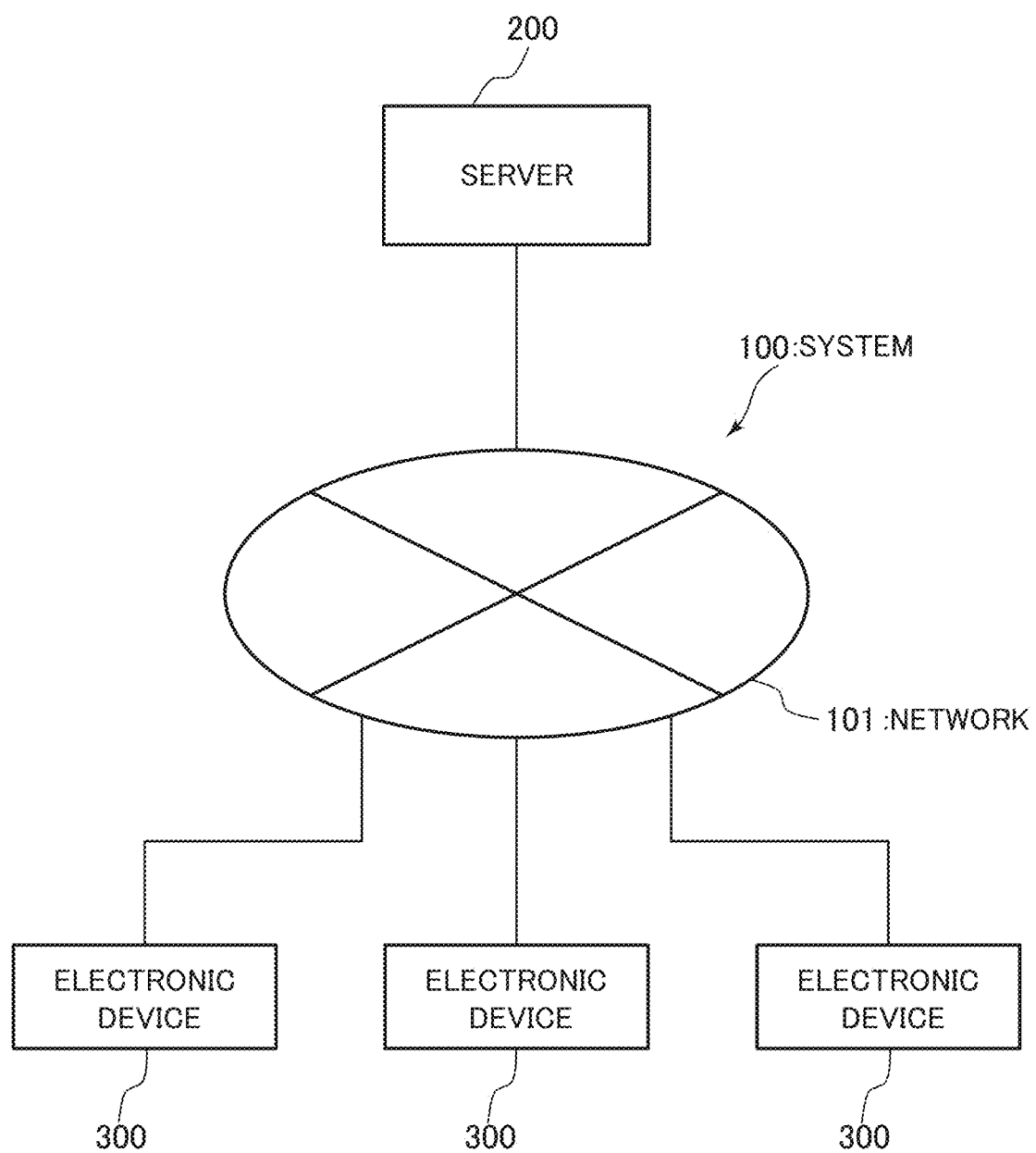
FIG. 1 shows an example of the overall configuration of a game system according to an embodiment of the present invention.

FIG. 1 shows an example of the overall configuration of a game system 100 according to an embodiment of the present invention. The system 100 is configured to include a server 200 and a plurality of electronic devices 300. These components are connected to each other via a network 101; alternatively, however, the components may be connected to each other individually as needed. Furthermore, in the case where one of the plurality of electronic devices also operates as a server, the system 100 may be configured not to include a server.

[Overview of the Configuration of a Server]

Figure 2:
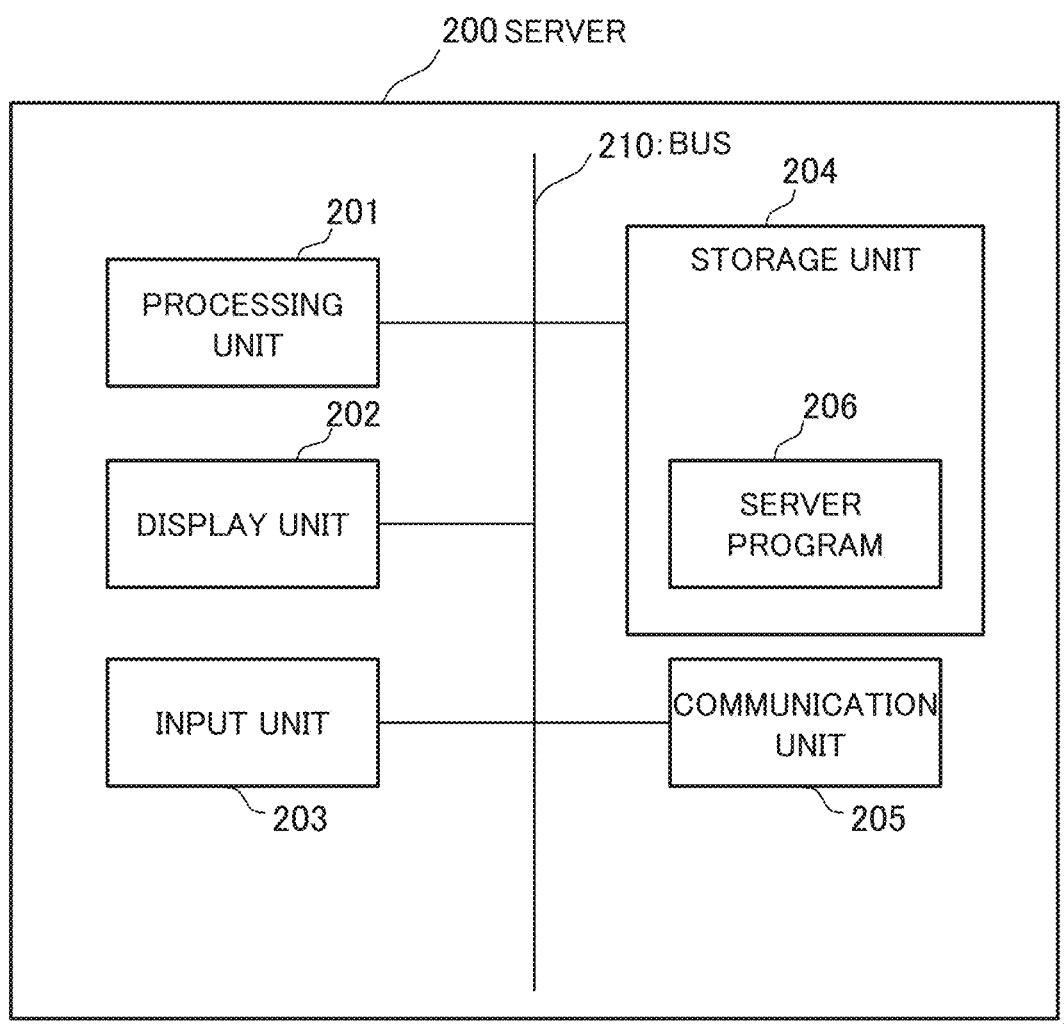
FIG. 2 is a block diagram showing the hardware configuration of a server according to the embodiment of the present invention.

FIG. 2 is a block diagram showing the hardware configuration of the server 200 according to an embodiment of the present invention. The server 200 includes a processing unit 201, a display unit 202, an input unit 203, a storage unit 204, and a communication unit 205. These components are connected to each other via a bus 210; alternatively, however, the components may be connected individually as needed.

The processing unit 201 includes a processor that controls the components of the server 200 and executes various kinds of processing by using the storage unit 204 as a work area. The display unit 202 has functionality for displaying information to a user. The input unit 203 has functionality for accepting inputs from a user, like a keyboard and a mouse. The storage unit 204 stores a server program 206 and various kinds of data that can be referred to when the program is executed. The storage unit 204 may be of any type that can store information, such as a hard disk, a non-volatile memory, or a volatile memory. The storage unit 204 may also be a removable memory, such as a memory card. The communication unit 205 carries out wired communications using an Ethernet (registered trademark) cable or the like or wireless communications such as mobile communications or wireless LAN communications to connect to the network 101.

For example, the server 200 is an information processing device that is used by a system administrator or the like when running and managing a game service. Upon receiving various kinds of commands (requests) from the electronic devices 300, the server 200 can distribute (send as responses) a game program that can operate on the electronic devices 300 or webpages, game screens, etc. created by using a markup language compatible with the specifications of the electronic devices 300.

These functions of the server 200 are realized by executing the server program 206; alternatively, however, these functions may be realized by configuring electronic circuits or the like.

[Overview of the Configuration of an Electronic Device]

Figure 3:
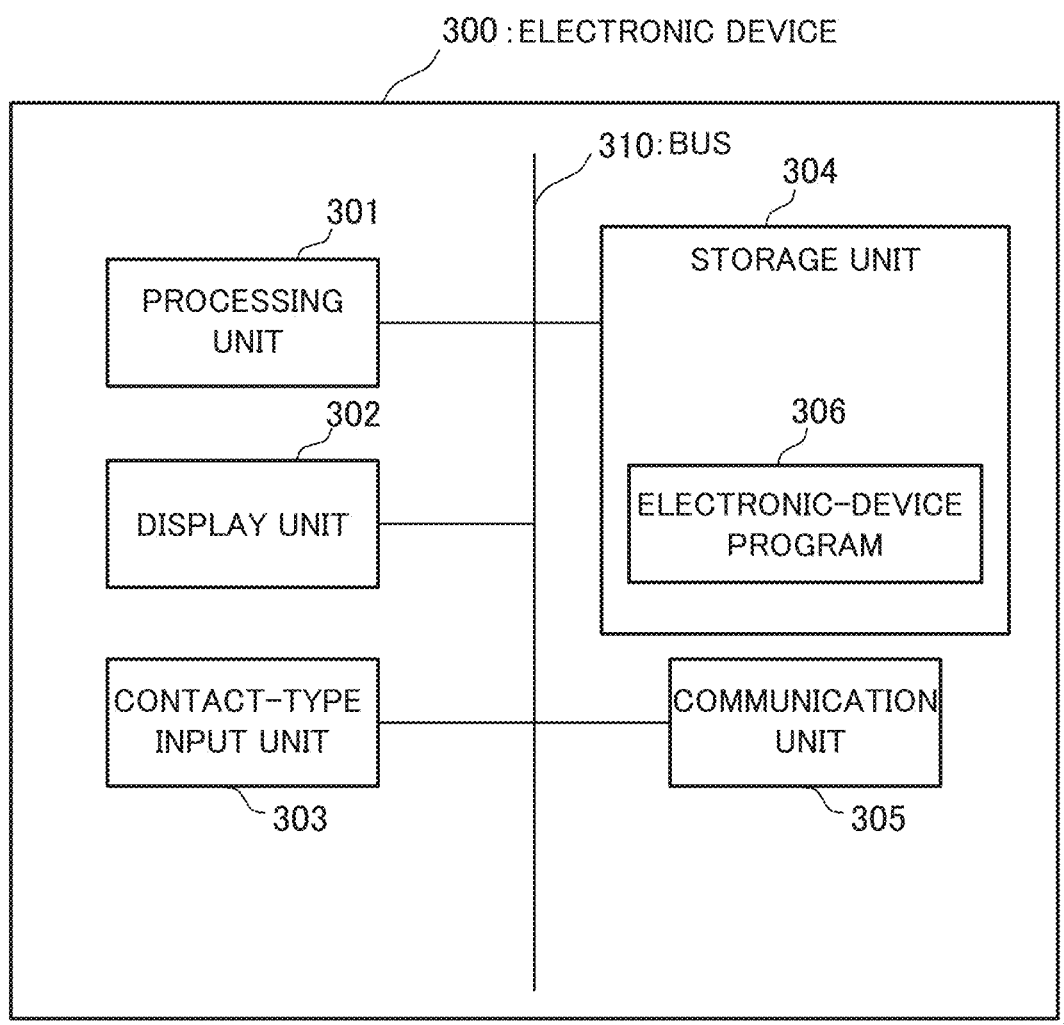
FIG. 3 is a block diagram showing the hardware configuration of an electronic device according to the embodiment of the present invention.

FIG. 3 is a block diagram showing the hardware configuration of an electronic device 300 according to an embodiment of the present invention. The electronic device 300 includes a processing unit 301, a display unit 302, a contact-type input unit 303, a storage unit 304, and a communication unit 305. These components are connected to each other via a bus 310; alternatively, however, the components may be connected individually as needed.

The electronic device 300 is preferably a smartphone; however, it may be, for example, a mobile phone, a mobile information terminal, a tablet computer, a video game machine, a portable video game machine, or a computer equipped with a contact-type input device, such as a touchpad.

The processing unit 301 executes various kinds of processing, such as game processing and image generation processing, on the basis of a program as well as data input from the contact-type input unit 303 or data received from a server. The processing unit 301 includes a processor that controls the components of the electronic device 300, and it executes various kinds of processing by using the storage unit 304 as a work area.

The storage unit 304 stores an electronic-device program 306. The storage unit 304 may be of any type that can store information, such as a hard disk, a non-volatile memory, or a volatile memory. The storage unit 304 may also be a removable memory, such as a memory card. For example, in the case where the electronic device 300 is a smartphone, the storage unit 304 includes a ROM and a RAM. The storage unit 304 stores the electronic-device program 306 and various kinds of data that can be referred to when the program is executed. The program may include programs for all kinds of applications requiring user input, such as a video game and a web browser. The various kinds of data include, for example, image data for displaying various kinds of images in a game and coordinate data that can be written to the storage unit 304 during a game.

The communication unit 305 carries out wired communications using an Ethernet (registered trademark) cable or the like or wireless communications, such as mobile communications or wireless LAN communications, to connect to the network 101.

The display unit (display) 302 displays images that are output by a program executed at the electronic device 300. The display unit 302 is preferably a liquid crystal display; alternatively, however, the display unit 302 may be an organic EL display, a plasma display, or the like.

The contact-type input unit 303 provides the electronic device 300 with an input based on a position touched by a player, for example, like a touchpad. Preferably, the display unit 302 and the contact-type input unit 303 are integrated as a touchscreen; alternatively, however, the display unit 302 and the contact-type input unit 303 may be disposed separately at different positions. For example, in the case where the display unit 302 and the contact-type input unit 303 are integrated as a touchscreen, an input by a user's touch on the display unit 302 is accepted, and the contact-type input unit 303 detects the coordinates corresponding to the position touched by the player and supplies the coordinates to the electronic device 300. Although any detection method (e.g., a capacitive detection method for a touchscreen) may be used, preferably, the contact-type input unit 303 is of the type that detects a player's finger or the like simultaneously touching at least two points and that supplies coordinate information corresponding to the individual detected positions to the electronic device 300.

Here, a touch refers to an operation or state in which a finger or the like contacts the contact-type input unit 303, i.e., the touchscreen in this embodiment. Although it is assumed in the description of this embodiment that a touch by a player is made by using a finger of the player, any finger may be used for touching, or something else may be used, such as a stylus. Meanwhile, a release is an operation or state in which a finger or the like is away from the touchscreen. A player operates the electronic device 300 mainly by touching and releasing. Such touch operations may include touch, long touch, multi-touch, release, swipe, tap, double tap, long tap, drag, flick, etc. For example, a swipe is an operation in which a touched position is changed while keeping a finger or the like in contact with the touchscreen, and a drag is an operation in which an object, icon, or the like displayed on a display is designated with a touch and in which a swipe is performed so as to involve a movement or shape change of the object, icon, or the like. Preferably, the processing unit 301 distinguishes among some of or all kinds of touch operations on the basis of a contact, a contact position, a contact period, or the number of contacts on the touchscreen with a finger or the like.

Figure 4:
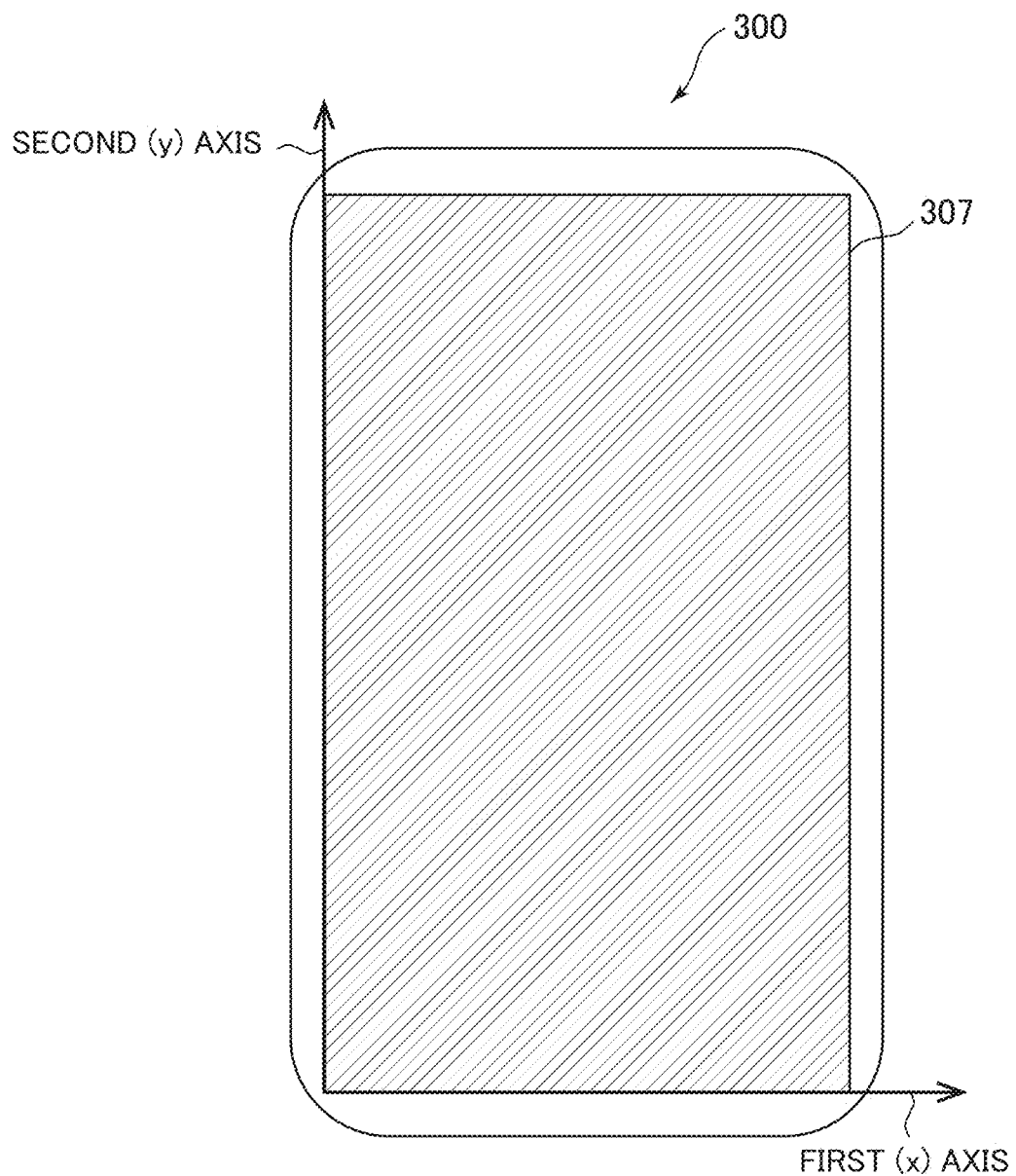
FIG. 4 is an illustration showing coordinate axes of a touchscreen of the electronic device according to the embodiment of the present invention.

For example, in the case where a smartphone is used as the electronic device 300, the display unit 302 and the contact-type input unit 303 are integrated as a touchscreen 307. In the contact-type input unit 303, a position is designated in the form of coordinates by using a coordinate plane defined by a first axis and a second axis substantially perpendicular to the first axis. Preferably, as shown in FIG. 4, the first axis is substantially parallel to the shorter sides of the display unit 302 (the contact-type input unit 303), which has a substantially rectangular shape, the second axis is substantially parallel to the longer sides of the display unit 302, and a position is represented in the form of coordinates (x, y) based on a coordinate axis in the first axis direction (horizontal axis) and a coordinate axis in the second axis direction (vertical axis). The processing unit 301 can obtain, by using a program or the like, a touched position detected by the touchscreen 307 in the form of data of such coordinates (x, y). For example, in the case where the detection precision of the touchscreen 307 is 640 dots×1136 dots, a resolution of 640 dots in the horizontal axis direction and 1136 dots in the vertical axis direction can be attained. In this case, each dot may be either a single point or a certain region (cell). It is to be noted, however, that the distance between dots usually varies among touchscreens (electronic devices). In this description, the term "distance" should be construed to mean a distance in terms of coordinates unless explicitly mentioned otherwise. The setting of coordinates shown in FIG. 4 is an example, and coordinate axes can also be set by a program. Alternatively, polar coordinates can be set, and other kinds of coordinate systems can be set through coordinate transformation.

As another example, in the case where the display unit 302 and the contact-type input unit 303 are disposed separately at different positions, it is possible to set coordinates as described above in the contact-type input unit 303, while setting coordinates corresponding to the coordinates for the contact-type input unit 303 in the display unit 302.

These functions of the electronic device 300 are realized by executing the electronic-device program 306; alternatively, however, these functions may be realized by configuring electronic circuits or the like.

[Overview of the Game]

The game provided by the game system 100 in the present invention is realized by causing the server 200 to execute the server program 206 and causing the electronic device 300 to execute the electronic-device program 306. In the processing or operation described below, the processing or operation executed by the server 200 according to the server program 206 may be realized by causing the electronic device 300 to execute the processing or operation according to the electronic device program 306, and vice versa, unless an inconsistency arises in the processing or operation.

In this embodiment, a smartphone is used as the electronic device 300. The electronic-device program 306 installed is, for example, a game application. A player can start the game by activating the application.

Figure 5:
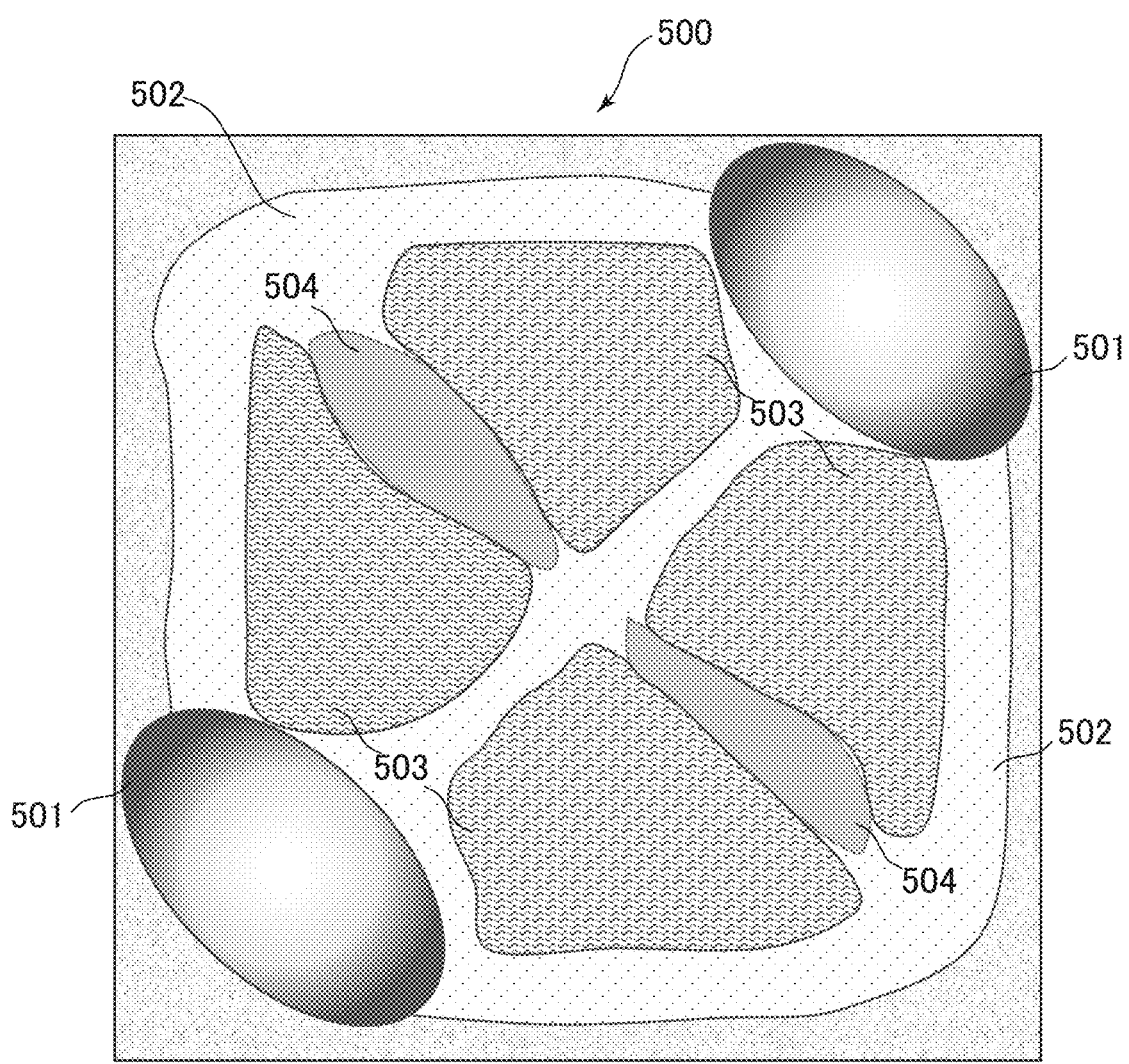
FIG. 5 shows a game field for a game according to the embodiment of the present invention.

An overview of the game provided by the game system 100 according to an embodiment of the present invention will be described. The game system 100 places characters individually operated by a plurality of players in a virtual space for the game, thereby allowing the players to play the game. Furthermore, the game system 100 creates a team (group) constituted of a plurality of players, places their characters in a game field 500 shown in FIG. 5, lets the team battle against an opponent team, and determines the result. The opponent team may be a team constituted of a plurality of players or a CPU team provided by the server program 206 or the like.

Areas 501 in the game field 500 represent the headquarters of the individual teams. The player's team wins the battle if the team succeeds in breaking or occupying the opponent headquarters before the opponent succeeds in the opposite. A lane 502 and a forest 503 serve as paths through which characters can be moved. Meanwhile, characters cannot be moved through a lake 504. It is to be noted, however, that the forest 503 is an area having features such that it is harder to move a character, a character is less easily discovered by other characters, and so forth, compared with the lane 502.

Figure 6A:
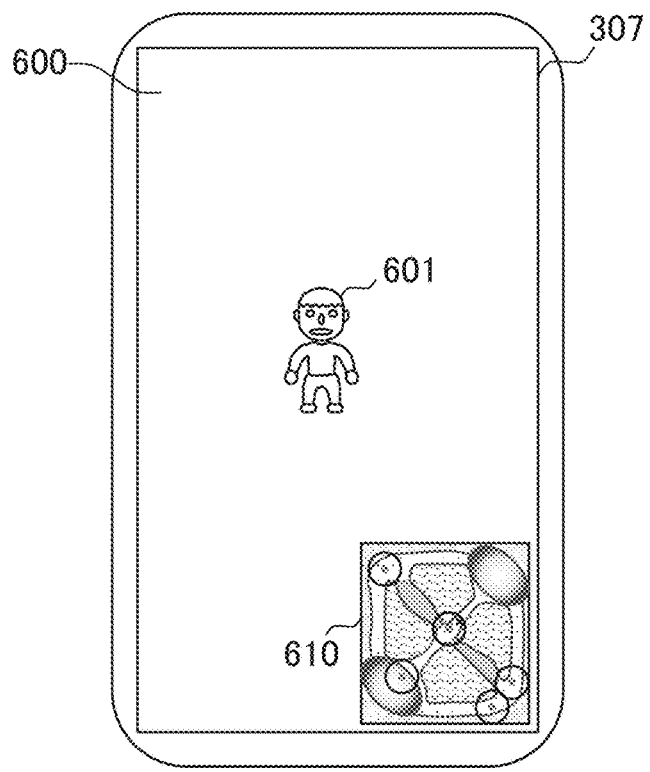
FIG. 6a shows a normal screen in the game according to the embodiment of the present invention.

FIG. 6*a* shows a normal screen 600 on the electronic device 300 operated by a player in the game. The normal screen 600 includes an operation screen showing at the center thereof a self-character 601 operated by the player and also includes a radar screen 610. Preferably, the operation screen is larger than the radar screen 610. In the normal screen 600, an indication of the status of the self-character 601, setting buttons, etc. can also be displayed.

Figure 6B:
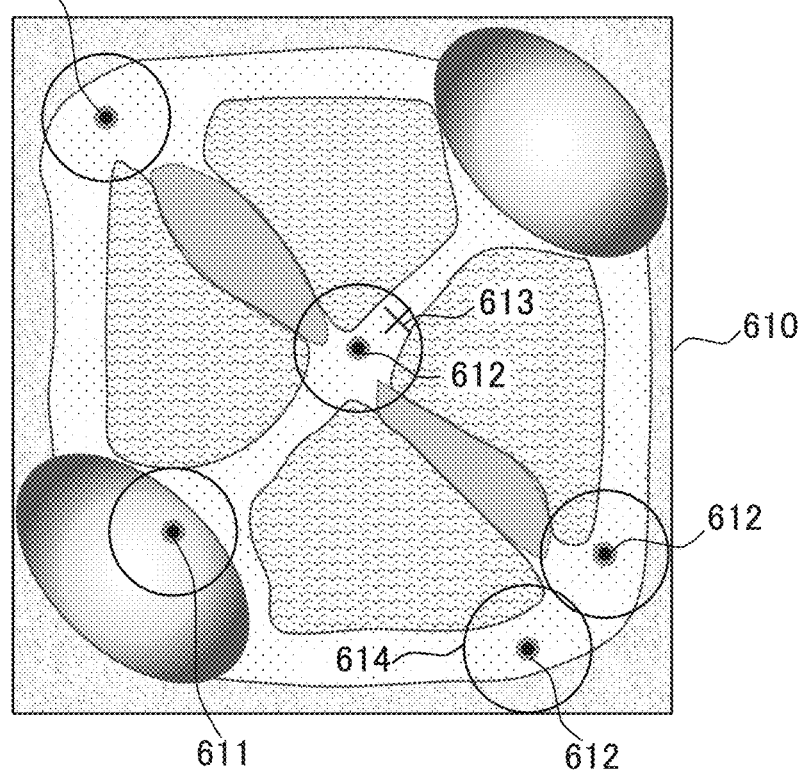
FIG. 6b shows a radar screen in the game according to the embodiment of the present invention.

FIG. 6*b* shows the radar screen 610. Before explaining the radar screen, the positions of characters in the game field will be described. Since players participating in this game play the game by operating their individual characters in the game field shown in FIG. 6*b*, it is necessary to share the positions of the individual characters in the game field. Therefore, each character has virtual coordinate position information in the virtual space of the game field. Hereinafter, what is referred to as a position in the radar screen refers to a position corresponding to virtual coordinates in the virtual space. The radar screen 610 is a screen showing a partial or entire map of the game field and showing a position 611 of the self-character and positions 612 of other characters in the same team as the self-character on the map. Places where the player can recognize the situation via the radar screen 610 are those within a possible capturing range 614 of the self-character 611 or the other players 612 in the same team as the self-character. The player or the other characters in the same team as the player can recognize a position 613 of an other character in the opponent team only in the case where the position 613 of that other character in the opponent team enters the possible capturing range 614. It may be made possible for the player to distinguish among the individual characters, for example by attaching character names to the self-character and other characters in the radar screen 610.

Figure 6C:
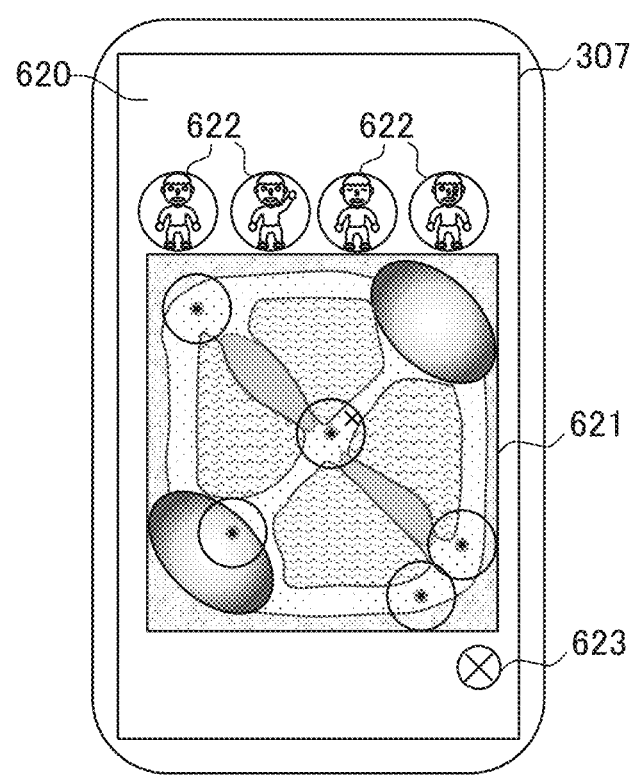
FIG. 6c shows a communication screen in the game according to the embodiment of the present invention.

Furthermore, the game system provides an interface for communication among the players in the team. FIG. 6*c* shows a communication screen 620 according to an embodiment of the present invention, in which a radar screen 621 is displayed in a predetermined area of the touchscreen 307. The communication screen 621 includes the radar screen 621 in the predetermined area, one or more icons 622 outside the predetermined area, and a screen switching button 623 outside the predetermined area. The communication screen 620 is a screen that enables players to quickly exchange information, such as messages. Switching to the communication screen 620 is performed by touching the display area of the radar screen 610 on the touchscreen 307 in the normal screen 600 shown in FIG. 6*a*. Alternatively, a predetermined touch operation may be defined for the purpose of this switching.

The radar screen 621 is a screen in which the radar screen 610 is displayed in a predetermined area and is usually a screen in which the radar screen 610 is enlarged. The icons 622 are provided to allow the player to send information to other players or the game field. Preferably, a plurality of icons 622 are provided in the communication screen 620, as shown in FIG. 6*c*. Furthermore, a greater number of icons 622 may be displayed in a sliding fashion in response to a predetermined touch operation, such as a swipe.

Each of the icons 622 has icon information corresponding to the graphic or text thereof. Here, the icon information refers to a text message, illustration, stamp, figure, image, voice, video, etc. that corresponds to the icon and that is to be displayed or reproduced at other electronic devices or command information for displaying or reproducing these kinds of data stored in a server or other electronic devices. Furthermore, the icon information may include information about the source player. The player can communicate with other players by selecting icons corresponding to such icon information.

It is to be noted that, in the case where the communication screen 620 is displayed, the player cannot operate the self-character, which may be disadvantageous for the self-character in proceeding with the game. Thus, in the case where the communication screen 620 is displayed, the character may be moved automatically by a program for the electronic device. Exchange of information and other communications among the players in the team by using the communication screen 620 will be explained in the context of game processing described below.

[Game Processing]

Figure 7:
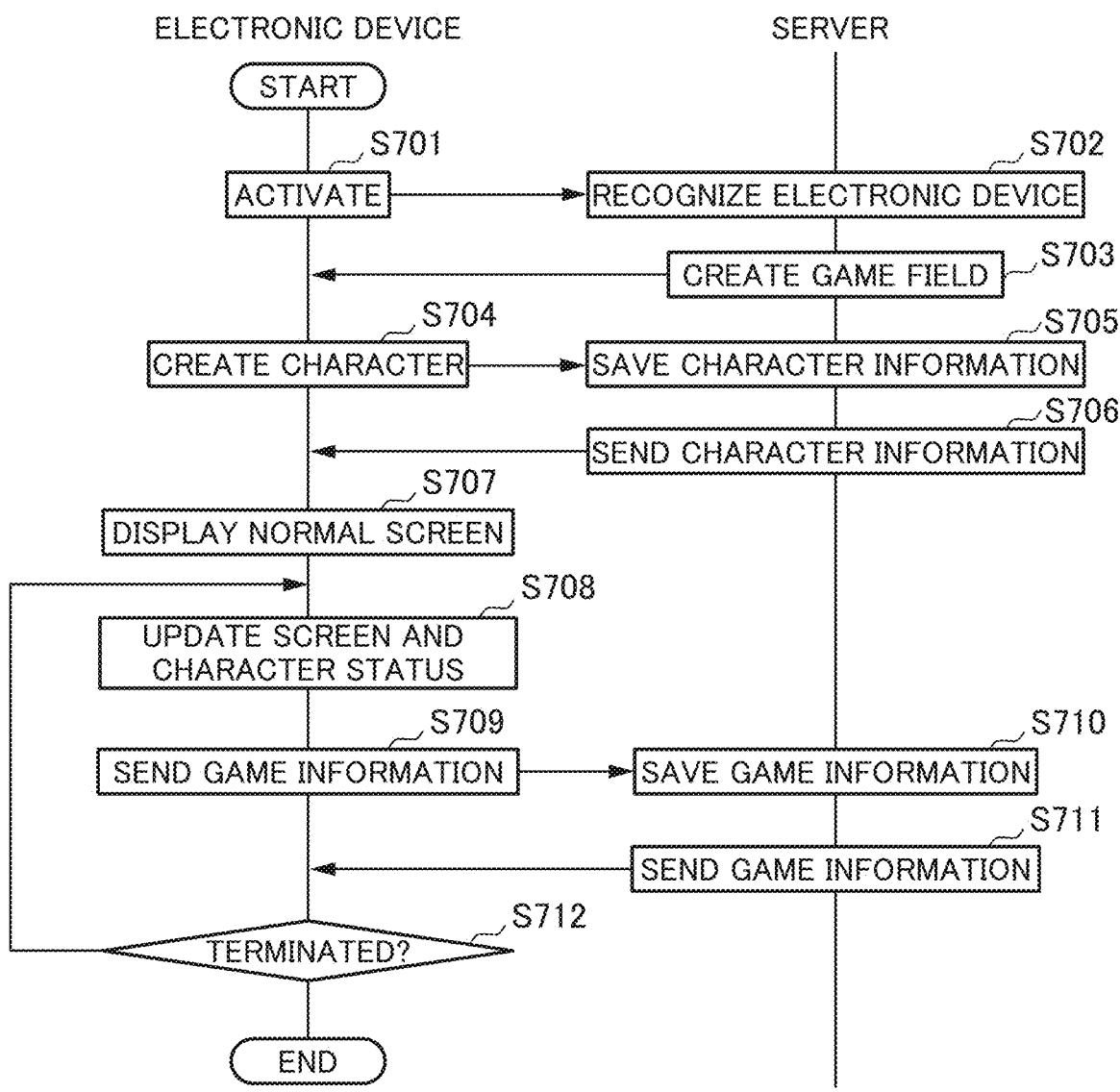
FIG. 7 is a flowchart for explaining information processing in the game system according to the embodiment of the present invention.

FIG. 7 is a flowchart for explaining information processing in the game system described above in the context of the game overview. The electronic device 300 activates the game when the electronic-device program 306 for the game is executed (step 701), starting communications with the server 200. Then, the server 200 recognizes the electronic device 300 (step 702). Then, the server 200 creates a game field and sends information about the game field to the electronic device 300 (step 703). Alternatively, the game field may be generated by executing the electronic-device program 306.

Then, the electronic device 300 creates a character (step 704). The character is created as selected by the player or automatically by the program. The electronic device 300 sends the created self-character information to the server 200 (step 704). The server 200 stores the character information and also stores other character information sent from other players (step 705).

Here, the character information represents various kinds of status of the character in the game and may include virtual coordinate position information of the character in the game field. The electronic device 300 and the server 200 exchange game information, including such character information and mutual communication information among characters. However, the data structures for information relating to the game are not limited to these data structures.

As described earlier, the character belongs to a team, and the game information or character information may include information about the team to which the character belongs. Preferably, the team to which the character belongs is determined by the server 200 after collecting character information of individual characters (step 705). Alternatively, however, the team may be determined by the server 200 when creating a game field and sending the game field to the electronic device 300 or at other timings or by other methods.

The server 200 sends a part of or the whole character information to each electronic device 300 on the basis of the stored character information (step 706). Then, the electronic device 300 receives the character information from the server, displays the normal screen 600 including the operation screen and the radar screen 602 shown in FIG. 6a (step 707), and updates the screen and various kinds of status of each character (step 708). As described earlier, however, preferably, the electronic device 300 does not display all the character information received from the server 200, for example, places where the player can recognize the situation via the radar screen 602 are limited.

The self-character information, including the position information, is updated when the character is operated by the player or an event occurs in the game field as the game proceeds. The electronic device 300 sends game information including the self-character information to the server 200 at predetermined intervals (step 709). The electronic device 300 may send game information to the server 200 regularly as described above or send game information to the server 200 in response to a request from the server 200. The server 200 stores the game information received from each electronic device 300 (step 710) and sends game information including other character information to the electronic device 300 (step 711), and the electronic device 300 receives this information. The server 200 may similarly send game information including character information of individual characters to each electronic device 300 at predetermined intervals or send the character information in response to a request from the electronic device 300. Then, steps 708 to 712 are repeated while the electronic device 300 continues to execute the game (step 712).

FIG. 8 shows a first embodiment of a flowchart for explaining information processing at the user interface for carrying out communications among players in the game system described earlier in the context of the game overview. The processing in the flowchart described below is executed simultaneously when steps 708 to 712 in FIG. 7 are executed. Alternatively, however, the processing may be configured to be executed in information processing according to a single flowchart by modifying it so as to be included in steps 708 to 712.

In order to display the normal screen 600 in step 707, at the start of the flowchart in FIG. 8, the electronic device 300 displays the normal screen 600 and waits to accept a touch on the touchscreen 307 by the player.

The electronic device 300 determines whether or not the touchscreen 307 is touched (step 801) and detects the touched position in the form of coordinates in the case where it is determined that the touchscreen 307 is touched (step 802). The electronic device 300 determines whether or not the coordinates of the detected touched position fall within a screen switching area (step 803).

In this embodiment, a smartphone is used as the electronic device 300. Generally, a smartphone performs touch detection at predetermined intervals and updates the screen at predetermined intervals. For example, the unit time for updating the screen may be set to be $1/30$ seconds, $1/60$ seconds, or $1/120$ seconds. In this flowchart, preferably, touch detection is performed in synchronization with the screen updating period. Furthermore, it is assumed that the coordinates of the detected touched position are stored in the storage unit 304 temporarily or until the end of the processing according to the flow unless specifically mentioned otherwise.

Whether or not the coordinates of the touched position fall within the screen switching area is determined on the basis of whether or not the coordinates of the touched position fall within a coordinate range corresponding to the displayed position of the radar screen 610 in the normal screen 600 shown in FIG. 6a. Alternatively, however, other areas may be set for the coordinate range used for this determination. The determination in step 803 may also be a determination based on whether or not a predetermined touch operation is detected.

In the case where it is determined in step 803 that the coordinates do not fall within the screen switching area, processing corresponding to the touch operation is performed (step 804), and the processing returns to step 801. Although not described here, the processing corresponding to the touch operation refers to processing for moving the self-character being operated, changing settings, etc.

In the case where it is determined in step 803 that the coordinates fall within the screen switching area, the electronic device 300 displays the communication screen 620 based on the radar screen 610 (step 805). Then, the electronic device 300 determines whether or not the touchscreen 307 is touched (step 806). In the case where it is determined that the touchscreen 307 is touched, the electronic device 300 detects the touched position in the form of coordinates (step 807) and determines whether or not the coordinates of the detected touched position fall within a coordinate range corresponding to the displayed position of the screen switching button 623 (hereinafter referred to as within the display range) (step 808). The determination in step 808 may also be a determination based on whether or not a predetermined touch operation is detected, instead of a touch within the display range of the screen switching button 623.

In the case where it is determined in step 808 that the coordinates fall within the display range of the screen switching button 623, the processing returns to step 801. In the case where it is determined that the coordinates do not fall within the display range of the screen switching button 623, it is determined whether or not the coordinates of the detected touched position fall within the display range of one of the one or more icons 622 (step 809). In the case where it is determined in step 809 that the coordinates do not fall within the display range of the icons 622, the processing returns to step 806. In the case where it is determined in step 809 that the coordinates fall within the display range of one of the icons 622, icon information corresponding to the icon is stored (step 810). In the case where the player has touched two points and the coordinates of the two detected touched positions fall within the display ranges of two different icons, icon information corresponding to the individual icons is stored.

After the icon information is stored, it is determined whether or not the touch is being continued (step 811). When the touch is no longer being continued or a release is detected, touched-position coordinates A1 detected just before the end of the touch are detected (step 812). Then, it is determined whether or not the detected touched-position A1 falls within a predetermined area of the touchscreen 307 (step 813). Preferably, the predetermined area is the coordinate range corresponding to the displayed position of the radar screen 621, as described earlier. With this processing, the player can first touch an icon to determine information to send and can then perform a drag operation while keeping the touch to determine a destination.

In the case where it is determined that the touched-position coordinates A1 do not fall within the predetermined area, the processing returns to step 806. This processing is effected in the case where the player cancels communications. In the case where it is determined that the touched-position coordinates A1 fall within the predetermined area, the touched-position coordinates A1 are converted into virtual coordinates A2 in the virtual space of the game field (step 814). That is, the virtual coordinates A2 are the coordinates at the position of the touched-position coordinates A1 in the virtual space of the game field shown in the radar screen 621, and the virtual coordinates A2 represent virtual coordinate position information having the same coordinate axes as the position 611 of the self-character and the positions 612 of other characters, described earlier.

Then, the electronic device 300 determines whether or not the converted virtual coordinates A2 satisfy a predetermined condition with the virtual coordinates of each other character (step 815). Preferably, the latest virtual coordinates received in step 711 are used as the virtual coordinates of each other character. The predetermined condition is, for example, that the distance between the virtual coordinates of the other character and the virtual coordinates A2 is within a predetermined distance.

In the case where it is determined in step 815 that there is no character satisfying the predetermined condition, while the electronic device 300 continues to execute the game (step 819), the processing returns to step 806. In the case where it is determined in step 815 that there is an other character satisfying the predetermined condition, a sending request is sent to the server 200 so that the server 200 will send the icon information stored in step 810 to the other electronic device 300 (other player) operating the other character satisfying the predetermined condition (step 816). The data of the sending request includes the icon information and information about the destination electronic device.

Preferably, this data is sent to the server 200 in step 709 as communication information included in game information; alternatively, however, this data may be sent to the server 200 as sending-request data separate from the information in step 709.

Upon receiving the sending request from the electronic device 300, the server 200 stores the information (step 817) and sends the icon information to the other electronic device 300 operating the other character satisfying the predetermined condition (step 818). The icon information is sent from the server 200 to the other electronic device 300 in step 711 as communication information included in game information. Alternatively, however, the icon information may be sent to the other electronic device 300 as icon-information sending data separately from step 711.

The information processing in which the server 200 sends the icon information to the other electronic device 300 has been described above by using the flowchart in FIG. 8. Next, information processing at the other electronic device 300 having received the icon information from the server 200 will be described. The other electronic device 300 also executes the information processing according to the flowchart shown in FIG. 7 and receives the icon information sent from the electronic device 300 in step 711 from the server 200. While the other electronic device 300 continues to execute the game (step 712), the other electronic device 300 updates the screen, etc. to display or reproduce information on the basis of the icon information (step 708). In the case where the icon information is a text message, illustration, stamp, figure, image, voice, or video, the other electronic device 300 displays or reproduces these kinds of information received from the server 200. Meanwhile, in the case where the icon information is command information for displaying or reproducing these kinds of data stored in the other electronic device 300, the server 200 has data to be displayed or reproduced, said data being stored in the storage unit 204, and sends the data to be displayed or reproduced, said data being stored in the storage unit 204, to the other electronic device 300 on the basis of the command information received from the electronic device 300, and the other electronic device 300 displays or reproduces these kinds of data received from the server 200. Alternatively, each of the electronic devices 300, including the other electronic device 300, has data to be displayed or reproduced, said data being stored in the storage unit 306 of that electronic device 300, and displays or reproduces these kinds of data on the basis of the command information received from the server 200. In the case where two icons have been selected and the other electronic device 300 has received two pieces of icon information, the other electronic device 300 displays or reproduces information on the basis of the two pieces of icon information. In displaying or reproducing information on the basis of the two pieces of icon information, a direct combination of the two pieces of icon information may be displayed or reproduced, or information that is different from the two pieces of icon information per se may be displayed or reproduced. The information processing at the other electronic device 300 at the receiving end is the same also in the following embodiment.

In the first embodiment, the following processing may be executed instead of steps 815 to 818. For example, the electronic device 300 having executed step 814 sends a sending request to the server 200 so that the server 200 will send the icon information stored in step 810 to all the other electronic devices 300 operating other characters in the same team as the player or to all the other electronic devices 300. In this case, the server 200 stores sending-request data including the icon information (step 817) and sends the icon information to all the other electronic devices 300 operating other characters in the same team as the player or to all the other electronic devices 300 (step 818). As another example, the electronic device 300 having executed step 814 sends a sending request to the server 200 so that the server 200 will send game information in which the icon information stored in step 810 is associated with the virtual coordinates A2 in the game field to all the other electronic devices 300 operating other characters in the same team as the player or to all the other electronic devices 300. The server 200 stores the game information (step 817) and sends the game information to all the other electronic devices 300 operating other characters in the same team as the player or to all the other electronic devices 300 (step 818). In this case, when the other character at one of the other electronic devices 300 having received the game information moves to a position within a predetermined distance of the virtual coordinates A2 within a predetermined time, the other electronic device 300 updates the screen, etc. to display or reproduce information on the basis of the icon information (step 708).

FIG. 9 is a second embodiment of a flowchart for explaining information processing at the user interface for carrying out communications among players in the game system described in the context of the game overview. Since the second embodiment is the same as the first embodiment for steps 801 to 814, the description thereof will be directed mainly to differences.

The electronic device 300 sends a sending request to the server 200 so that the server 200 will send the icon information stored in step 810 to at least one other electronic device 300 (other player) (step 820). The sending-request data includes the icon information and information about the virtual coordinates A2. Preferably, the sending-request data is sent to the server 200 in step 709 as communication information included in game information; alternatively, however, the sending-request data may be sent to the server 200 separately from step 709. The processing returns to step 806 while the electronic device 300 continues to execute the game (step 824).

Upon receiving the sending request from the electronic device 300, the server 200 stores the received data (step 821) and determines whether or not the received virtual coordinates A2 satisfy a predetermined condition with the virtual coordinates of each other character (step 822). Preferably, the latest virtual coordinates stored at the server are used as the virtual coordinates of each other character. The predetermined condition is, for example, that the distance between the virtual coordinates of the other character and the virtual coordinates A2 is within a predetermined distance. In the case where it is determined in step 822 that there is no other character satisfying the predetermined condition, the server 200 does not send the icon information to the other electronic devices 300. In the case where it is determined in step 822 that there is an other character satisfying the predetermined condition, the server 200 sends the icon information to the other electronic device 300 operating the other character satisfying the predetermined condition (step 823). The icon information is sent from the server 200 to the electronic device 300 in step 711 as communication information included in game information. Alternatively, however, the icon information may be sent to the electronic device 300 as icon-information sending data separately from step 711. As described above, in the second embodiment, the sending destination is determined mainly by the server 200.

In the second embodiment, the following processing may be executed instead of steps 821 to 823. For example, upon receiving the sending request including the icon information, the server 200 stores the received data (step 821) and sends the icon information to all the other electronic devices 300 operating other characters in the same team as the player or to all the other electronic devices 300 (step 823). As another example, the server 200 stores game information in which the icon information is associated with the virtual coordinates A2 in the game field (step 821) and sends the game information to all the other electronic devices 300 operating other characters in the same team as the player or to all the other electronic devices 300 (step 823). In this case, when the other character at one of the other electronic devices 300 having received the game information moves to a position within a predetermined distance of the virtual coordinates A2 within a predetermined time, the other electronic device 300 updates the screen, etc. to display or reproduce information on the basis of the icon information (step 708).

In the first and second embodiments, the player can send icon information to an arbitrary position in the radar screen 621 or to another player by touching the radar screen 610 in the normal screen 600 to display the communication screen 620, touching one of the icons 622 corresponding to communication information to determine information to send while checking the game field and movement of other characters on the radar screen 621 in the communication screen 620, and performing a drag operation onto the radar screen while keeping the touch. Therefore, the player can communicate with other players quickly by using the radar screen 621. As described above, the first and second embodiments are the same regarding the operability for the player. However, there is a difference regarding the determination of an other electronic device 300 that serves as a sending destination in that it is determined by the electronic device 300 in the first embodiment whereas it is determined by the server 200 in the second embodiment.

FIG. 10 is a third embodiment of a flowchart for explaining information processing at the user interface for carrying out communications among players in the game system described in the context of the game overview. Since the third embodiment is the same as the first embodiment for steps 801 to 811 and steps 813 to 819, the description thereof will be directed mainly to differences.

After the icon information is stored, it is determined whether or not the touch is being continued (step 811). When the touch is no longer being continued or a release is detected and then a touch is detected again (step 825), the detected touched position is detected as touched-position coordinates A1 (step 826). Steps 827 to 833 after this detection are the same as steps 813 to 819 in the first embodiment.

FIG. 11 is a fourth embodiment of a flowchart for explaining information processing at the user interface for carrying out communications among players in the game system described in the context of the game overview. Since the fourth embodiment is the same as the second embodiment for steps 801 to 811 and steps 813 to 824 and is the same as the third embodiment for steps 825 to 826, the fourth embodiment is a combination of the embodiments described above.

The third and fourth embodiments differ from the first and second embodiments in that a sending destination is determined by the player touching an icon displayed in the communication screen 620 to determine information to send and again touching the radar screen 620 immediately.

In the processing or operation described above, the processing or operation can be modified freely as long as no inconsistency occurs in the processing or operation, such as an inconsistency that a certain step involves the use of data that could not yet be available in that step.

The embodiments described above are examples for explaining the present invention, and the present invention is not limited to the embodiments. The present invention can be embodied in various forms as long as those forms are within the gist thereof.

REFERENCE SIGNS LIST

100 System
101 Network
200 Server
201 Processing unit
202 Display unit
203 Input unit
204 Storage unit
205 Communication unit
206 Server program
210 Bus
300 Electronic device
301 Processing unit
302 Display unit
303 Contact-type input unit
304 Storage unit
305 Communication unit
306 Electronic-device program
307 Touchscreen
310 Bus
500 Game field
501 Area
502 Lane
503 Forest
504 Lake
600 Normal screen
601 Character
610, 621 Radar screens
611, 612, 613 Positions
614 Possible capturing range
620 Communication screen
622 Icon
623 Screen switching button

The invention claimed is:

1. A server in a game system that includes the server and an electronic device and one or more other electronic devices connected to the server via a network and that places characters operated by individual electronic devices connected to the server in a game field to proceed with a game, the server comprising:
a virtual-coordinate-position receiving part configured to receive virtual coordinate positions indicating positions of the individual characters operated by the individual electronic devices in the game field; and
a virtual-coordinate-position sending part configured to send the virtual coordinate positions to each of the electronic devices,
wherein the server, upon receiving from the electronic device a sending request in response to a touch termination position or a retouched position falling within a coordinate range corresponding to a predetermined area of a display unit in the electronic device, processes the sending request including icon information and a virtual coordinate position accompanying the icon information,
wherein the touch termination position or the retouched position corresponds to a touch on a contact position input device in the electronic device, and
wherein the server determines whether or not the virtual coordinate position accompanying the icon information and the virtual coordinate position of each of the other characters operated by the other electronic devices satisfy a predetermined condition and sends the icon information to the other electronic devices operating other characters satisfying the predetermined condition.

2. The server according to claim 1, wherein the virtual coordinate positions of the individual characters are displayed in a radar screen disposed in the predetermined area of the display unit.

3. The server according to claim 1, wherein the server comprises functionality for:
recognizing the individual electronic devices;
creating the game field in response to recognizing the individual electronic devices; and
sending information about the game field to the individual electronic devices.

4. The server according to claim 1, wherein the server comprises functionality for:
facilitating communication of one or more messages among a plurality of players in a first team in the game field,
wherein the individual electronic devices correspond to a plurality of teams comprising the first team.

5. The server according to claim 1, wherein the server includes functionality for:
updating the virtual coordinate positions based on game information and in response to the individual characters being operated within the game or an event occurs in the game field,
wherein the game information is sent to the server at a predetermined interval.

6. The server according to claim 1, wherein the predetermined condition is that the distance between the virtual coordinate position accompanying the icon information and the virtual coordinate position of each of the other characters operated by the other electronic devices is within a predetermined distance.

* * * * *